April 22, 1958 G. H. TOWNER 2,832,020
SYNCHRO SYSTEM AND QUADRATURE VOLTAGE ELIMINATOR THEREFOR
Filed April 12, 1954 2 Sheets-Sheet 1

INVENTOR:
George H. Towner
By Hubert E. Metcalf
His Patent Attorney

April 22, 1958  G. H. TOWNER  2,832,020
SYNCHRO SYSTEM AND QUADRATURE VOLTAGE ELIMINATOR THEREFOR
Filed April 12, 1954  2 Sheets-Sheet 2
*Fig. 3*
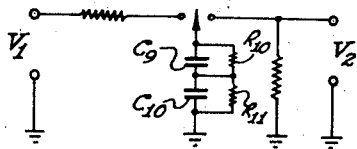
*Fig. 8*
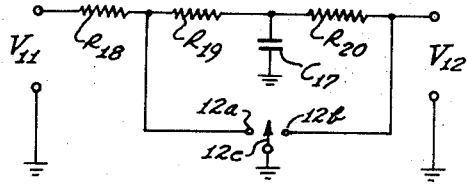
*Fig. 4*
*Fig. 5*
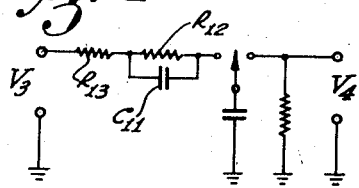
*Fig. 9*
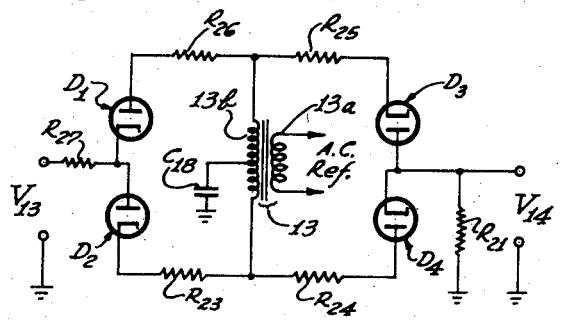
*Fig. 6*
*Fig. 7*
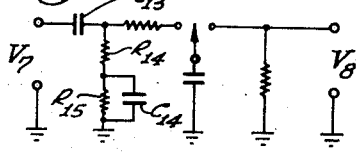
*Fig. 10*
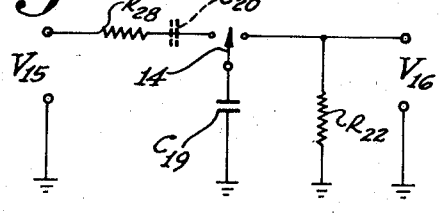
INVENTOR:
George H. Towner
By Hubert E. Metcalf
His Patent Attorney

United States Patent Office 2,832,020
Patented Apr. 22, 1958

2,832,020

SYNCHRO SYSTEM AND QUADRATURE VOLTAGE ELIMINATOR THEREFOR

George H. Towner, San Diego, Calif., assignor to Northrop Aircraft, Inc., Hawthorne, Calif., a corporation of California Application April 12, 1954, Serial No. 422,545

25 Claims. (Cl. 318—30)

This invention relates generally to means for producing accurately operable synchro systems and more particularly to means for eliminating the quadrature voltage in the error signal of an A. C. servo system.

In a synchro tie system, input data is electrically transmitted from a remote location to a central point. This data usually consists of a mechanical input to the rotor of a transmitting synchro and the output is secured from a receiving synchro, the rotor of which assumes the same relative orientation to which the transmitting rotor is set, with respect to their stators. The receiving synchro is responsive to a resultant signal whose phase is dependent upon the relative magnitudes of in-phase and quadrature components of the error signal received. In a null detection servo system, there is a large amount of quadrature signals in the synchros, usually greater than the true null in-phase voltage signal. The received data indicated by the position of the receiving synchro rotor can thus be in error because of the effect of quadrature voltage on the receiver synchro.

It is an object of this invention to provide a synchro system wherein an accurate null point is reproduced.

Another object of the invention is to provide means for eliminating the quadrature voltage from an error signal.

Another object of the invention is to provide quadrature voltage eliminators which include either integral or error rate (derivative) damping means.

A further object of this invention is to provide a fully electronic quadrature voltage eliminator.

Briefly, the foregoing and other objects are preferably accomplished by providing an electromechanical chopper, the vibrating reed of which is adapted to be driven at the same frequency and phase of a reference signal energizing the rotor of a transmitting synchro. A capacitance is connected to the reed which makes contact with a chopper terminal to charge the capacitance for half a reference cycle and then contacts another chopper terminal to discharge the capacitance through an output resistance thereby providing a square wave output signal. This quadrature voltage eliminator is adapted to be connected to the rotor of a receiving synchro which provides an input signal to the eliminator. The output from the eliminator is used to energize a servomotor which correctly positions the rotor of the receiving synchro to a null position corresponding to the orientation of the transmitting rotor, in respect to synchro stators. Means are included to provide suitable damping of servomotor response. Different forms of the quadrature voltage eliminator are shown, including a fully electronic version thereof.

The invention will be more fully understood by reference to the accompanying drawings, in which:

Figure 3 shows a quadrature voltage eliminator circuit including integral damping means.

Figures 4, 5 and 6 are wiring diagrams which illustrate quadrature voltage eliminator circuits which include error rate damping means.

Figure 7 shows a quadrature voltage eliminator circuit wherein the output approximates the first derivative or error change only.

Figure 8 illustrates an eliminator circuit wherein the chopper reed is connected directly to ground.

Figure 9 is the electronic analogue to the chopper circuit of Figure 10.

Figure 1:
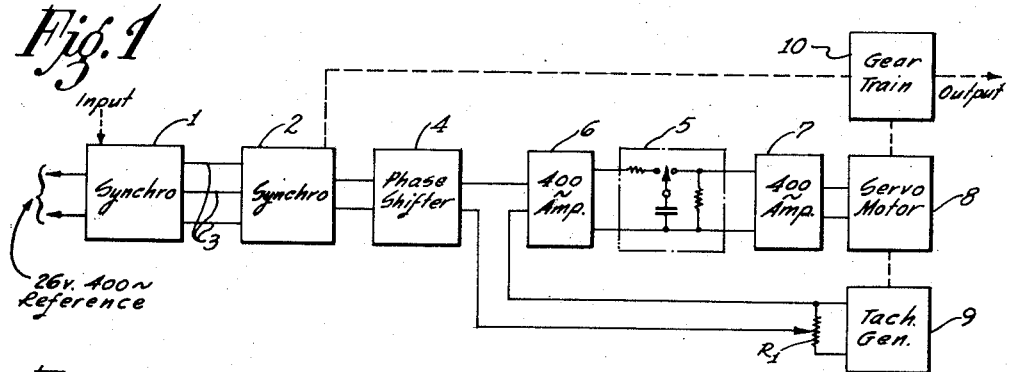
Figure 1 is a block diagram of a synchro system which includes a quadrature voltage eliminator.

Referring first to Figure 1, there is shown a block diagram of a null detecting servo system. A synchro 1 has a rotor excited by a 26 volt, 400 C. P. S. reference voltage for example. A mechanical input, as shown, is provided to the rotor of synchro 1 which is generally located remotely from synchro 2. The stators of these two synchros 1 and 2 can be either Y or delta connected and are connected together by three leads 3. The rotor of synchro 2 is connected to a phase shifter 4. The rotor of synchro 2 is free to reproduce the input data presented to synchro 1 by assuming the same angular orientation (with respect to the stators) of the rotor of synchro 1. There is, however, a large amount of quadrature voltage existing in the synchro system, often much greater than the true null (in-phase) signal component. Thus, the "noise" (signal components which do not transmit useful information) tends to obscure location of a correct null position. A majority of harmonics is also eliminated along with removal of quadrature voltage.

Phase shifter 4 is used to correct for discrepancies of error signal phase as compared with that of the power line. For example, input synchro 1 is frequently part of a packaged unit and the rotor thereof may be excited indirectly through various networks from a power line, thereby introducing a phase shift in the signal actually exciting the rotor. Further, even though the input synchro rotor is directly excited off the power line, there may be a phase difference produced at the electromechanically actuated chopper in quadrature voltage eliminator 5 which is preceded by a 400 C. P. S. amplifier 6 and followed by another 400 C. P. S. amplifier 7. The output of amplifier 7 is fed to servomotor 8 which is mechanically coupled directly to a tachometer generator 9 as well as gear train 10. The tachometer generated voltage across a resistance $R_1$ is fed back to the input of amplifier 6 such to oppose the output of phase shifter 4 thereby providing damping of servo rotor to prevent hunting thereof. The output of the servo-motor 8 is used through gear train 10 to correct the rotor position of synchro 2. An accurate null is achieved for the rotor of synchro 2 and an output from gear train 10 which is proportional to this rotor movement can also be used to drive external equipment (an analogue to digital function converter, for example, for a pulse output).

Figure 2:
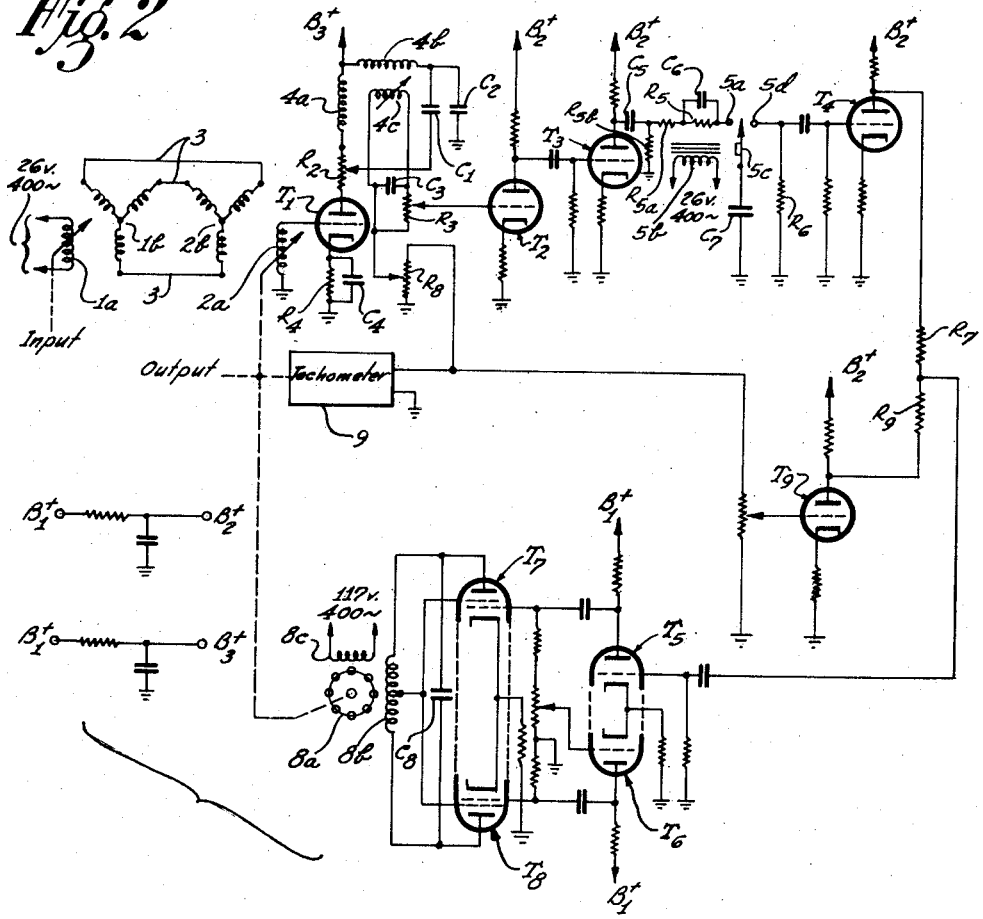
Figure 2 is a detailed wiring diagram for the block diagram of Figure 1.

A detailed wiring diagram for the block diagram of Figure 1 is shown in Figure 2. Rotor $1a$ can be mechanically varied according to the input applied thereto. Stator $1b$ is connected to stator $2b$ by three leads 3. The stators are shown Y connected but can be delta connected without distinction. Rotor $2a$ is to follow the orientation of rotor $1a$ as determined relative to the stators $2b$ and $1b$, respectively. It is noted that the coil on rotor $1a$ is excited by a 26 volt, 400 C. P. S. reference voltage and the coil on rotor $2a$ is connected to a grid of a triode $T_1$ on one end and to ground on the other end. A plate load resistance $R_2$ is connected to the plate of $T_1$ and a fixed coil $4a$ is connected in series with $R_2$ to a supply voltage $B_3+$. Coil $4a$ is a stator winding of a resolver and coil $4b$ is another stator winding separated 90 degrees from coil $4a$ on the same resolver. Coil $4b$ is connected to $B_3+$ on one end and to a tap on resistance $R_2$ through a series capacitance $C_1$ on the other end. A by-pass capacitance $C_2$ is also connected to the latter end of coil $4b$ to ground. Coil $4c$ is located on the rotor of the resolver and a capacitance $C_3$ is connected across coil $4c$. A resistance $R_3$ is also connected across coil $4c$ and a tap output on $R_3$ is connected to the grid of a triode $T_2$. Cathode resistance $R_4$ is a bias resistance and capacitance $C_4$ is a bypass capacitance.

$T_2$ is a conventionally connected amplifier which is coupled to another conventional amplifier stage $T_3$. The output of $T_3$ is coupled by capacitance $C_5$ to the input of a quadrature voltage eliminator 5. As illustrated here, an input resistance $R_{5a}$ connects $C_5$ to resistance $R_5$ which is shunted by a capacitance $C_6$ connecting with a contact $5a$ of a chopper excited through a coil $5b$ energized by a 26 volt, 400 C. P. S. reference voltage. Resistance $R_{5b}$ connected between $C_5$ and $R_{5a}$ provides a ground return. A pole, or reed $5c$ is thus caused to vibrate between one position contact $5a$ and another position contact $5d$. Reed $5c$ is connected to ground through a capacitance $C_7$ and a resistance $R_6$ is connected to contact $5d$ to ground. An output signal is derived across resistance $R_6$ and is conventionally coupled to an amplifier $T_4$ as shown. The output from $T_4$ is provided to the input of a conventional paraphase amplifier consisting of tube sections $T_5$ and $T_6$ through an adder resistance $R_7$. The output of the paraphase amplifier provides an input to a push-pull amplifier consisting of tetrodes $T_7$ and $T_8$, the output of which is used to drive servo-motor 8. The rotor $8a$ will rotate according to the polarity of the signal applied to center-tapped field winding $8b$. Another fixed stator winding $8c$ positioned 90 degrees from $8b$ is excited by a 117 volt, 400 C. P. S. reference voltage. Capacitance $C_8$ is connected across winding $8b$ to modify the steepness of input pulse voltage rise, preventing too large an induced voltage in $8b$.

Rotor $8a$ is mechanically coupled to rotor coil $2a$ of synchro 2 to position rotor $2a$ properly. Tachometer generator 9 is also coupled to rotor $8a$ and an output voltage developed across resistance $R_8$ is connected by a tap to an end of resistance $R_3$ providing damping voltage to the input of $T_2$. Tachometer generator output is also connected to the conventional amplifier $T_9$ and added to the output of $T_4$ through resistance $R_9$ for additional damping effect. This latter damping is optional and can be omitted if desired. A mechanical output can be secured from connection with rotor $8a$ to drive external equipment. It is noted that the supply voltages $B_2+$ and $B_3+$ are secured from $B_1+$ after dropping and filtering through suitable R-C networks.

Operation of the circuit of Figure 2 simply requires proper adjustment of coil $4c$ such that a maximum output signal is secured. This condition implies that the reference signal applied to the coil on rotor $1a$ is in phase with that provided to winding $5b$ which actuates reed $5c$ accordingly. Thus, when reed $5c$ contacts terminal $5a$, capacitance $C_7$ is being charged during this half cycle of the reference voltage applied to $5b$. On the next half cycle, reed $5c$ contacts terminal $5d$ and capacitance $C_7$ is connected to discharge through resistance $R_6$. This occurs every cycle and the output voltage across $R_6$ consists essentially of square pulses which are present during each half cycle that $C_7$ is connected to $R_6$. Since reed $5c$ is driven in phase at the reference frequency of the error signal, information averaged over the first half cycle provides the resultant output signal and this signal only includes the in-phase components of the error signal since quadrature signals will average zero over this period. A long time constant ($C_7$ and $R_6$) is preferred since this produces less slope and the output more nearly approaches a square wave. If the time constant is short ($R_6$ is low, for example) the pulses may be of equal amplitude and appear as spikes. The resistances connected to chopper point $5a$ should be small if envelope time lag is to be minimized.

Rotor $8a$ damping is provided partly by tachometer generator feedback in Figure 2 and partly by derivative phase lead caused by $C_6$ and $R_5$. Instead of using tachometer generator damping, the addition of a few elements to quadrature voltage eliminator 5 can give the modulation envelope of the carrier a phase lead or lag and thus provide suitable servo damping. Figure 3 illustrates a circuit including integral damping. In this circuit, two capacitances $C_9$ and $C_{10}$ are connected in series with the chopper reed and resistances $R_{10}$ and $R_{11}$ respectively shunt the capacitances, as shown (either one of these resistances may be omitted without adverse effect on integral damping). In this instance, the following relation holds (approximately)

$$V_2 = K_1 V_1 + K_2 \int_{t_1}^{t_2} V_1 dt$$

where $V_1$ is the input error signal, $V_2$ is the output signal, and $K_1$ and $K_2$ are constants and $t_2 - t_1$ is several cycles or more of the carrier frequency.

Figures 4, 5 and 6 illustrate quadrature voltage eliminators which include error rate damping. In Figure 4, series resistance $R_{12}$ and shunting capacitance $C_{11}$ are added to the input resistance $R_{13}$. For this circuit $$V_4 = K_3 V_3 + K_4 \left(\frac{dV_3}{dt}\right)$$

(approximately); in which $V_3$ is the error input signal envelope magnitude, $V_4$ is the output signal, and $K_3$ and $K_4$ are constants. A similar relation exists for the circuits of Figures 5 and 6. In Figure 5 a capacitance $C_{12}$ shunts a portion of the output (discharge) resistance and in Figure 6, a blocking capacitance $C_{13}$ has been added in series at the input with resistances $R_{14}$ and $R_{15}$ connected to $C_{13}$ to ground as shown. Another capacitance $C_{14}$ is connected to shunt $R_{15}$. It is to be noted that the eliminator circuit 5 as shown in Figure 1 is the basic chopper circuit to which modifications are made and indicated. Return through input is understood for the eliminator circuits except where blocking is provided. Of course, the chopper reed is actuated by a coil such as $5b$ (Figure 2) in each case but have not been shown in Figures 1, 3 through 8 and 10 for clarity of illustration. It is also evident that the eliminator circuit of Figure 2 can provide some error rate damping by means of resistance $R_5$ and shunting capacitance $C_6$.

Figure 7 shows a circuit which, in addition to quadrature voltage suppression, provides an output approximating the first derivative or change of input signal only. The usual input series resistance is followed by a capacitance $C_{15}$ and preceded by a shunt resistance $R_{16}$, and the usual output shunt resistance is replaced by a series resistance $R_{17}$ and a shunting parallel inductance 11 and capacitance $C_{16}$ combination connected as shown to produce a sine wave output. Another quadrature eliminator circuit is shown in Figure 8 wherein the chopper reed can be connected directly to ground. Three series resistances $R_{18}$, $R_{19}$ and $R_{20}$ connect an input terminal to an output terminal. A capacitance $C_{17}$ is connected between $R_{19}$ and $R_{20}$ to ground. A contact $12a$ is connected between $R_{18}$ and $R_{19}$, and the other contact $12b$ is connected between $R_{20}$ and the output terminal to which $R_{20}$ is tied to. The chopper reed $12c$ is connected directly to ground, this reed $12c$ being vibrated from one contact to the other by an energizing coil (not shown) just like reed $5c$ (Figure 2).

An electronic quadrature voltage eliminator is shown in Figure 9. Four diodes $D_1$, $D_2$, $D_3$ and $D_4$ are connected such that the cathode of $D_1$ is connected to the plate of $D_2$, cathode of $D_2$ connected to the plate of $D_4$ through two series resistances $R_{23}$ and $R_{24}$, cathode of the next successive diode $D_4$ connected to the plate of $D_3$ and the cathode of $D_3$ connected through series resistances $R_{25}$ and $R_{26}$ to the plate of $D_1$, in a ring. An input terminal is connected by input resistance $R_{27}$ to the cathode of $D_1$ (and plate of $D_2$) and the other input terminal is connected to ground. An output terminal is connected to the plate of $D_3$ (and cathode of $D_4$) and the other output terminal is connected to ground. The primary $13a$ of a transformer 13 is excited by an A. C. reference voltage and the secondary $13b$ is connected at one end to the common junction of $R_{23}$ and $R_{24}$, the other end being connected between $R_{25}$ and $R_{26}$. The secondary $13b$ center tap is connected to ground through a capacitance $C_{18}$. An output resistance $R_{21}$ is connected to the plate of $D_3$ (and cathode of $D_4$) on one end and to ground on the other end.

The four diodes function as switches which permit $C_{18}$ to charge on one half cycle and to discharge through $R_{21}$ during the other half cycle of the exciting A. C. reference signal. When the plate of $D_1$ is positive and cathode of $D_2$ is negative, $D_1$ will conduct if $V_{13}$ is negative whereas $D_2$ would conduct if $V_{13}$ is positive. During this half cycle diodes $D_3$ and $D_4$ cannot conduct because of the polarity on the cathode of $D_3$ and plate of $D_4$ and $C_{18}$ will build up a suitable charge thereon. On the next half cycle, $D_1$ and $D_2$ are biased off but $D_3$ or $D_4$ can conduct depending upon whether a negative or positive charge, respectively, is on $C_{18}$, this charge discharging through $R_{21}$ for an output voltage. This circuit is analogous to the electromechanical chopper shown in Figure 10 (actuating coil not shown) wherein chopper 14 corresponds to the combination of diodes, connecting resistances and transformer arrangement of Figure 9. $C_{18}$ corresponds to $C_{19}$, $R_{27}$ corresponds to $R_{28}$ and $R_{21}$ corresponds to $R_{22}$. The difference between these two circuits lie in the fact that the diodes have higher resistances when conducting than does a straight switch ($R_{23}$, $R_{24}$, $R_{25}$ and $R_{26}$ omitted). Inclusion of the stabilizing resistances would increase this resistance. Consequently, the circuit of Figure 9 is employed with higher input error signals while that of Figure 10 is useful with input signals of extremely small magnitudes. The circuit of Figure 9 will operate at much higher frequencies than is practical with an electromechanical chopper, however.

A capacitance $C_{20}$ shown in broken lines in Figure 10 can be inserted in the basic quadrature eliminator circuit to provide a simple eliminator circuit including integral damping. This circuit is generally sufficient in most servo networks where integral damping is desired.

Thus, an accurate null seeking synchro system has been presented. Several specific versions of quadrature voltage eliminators, which can be substantially substituted one for another in a circuit, has also been described, however, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A synchro system, comprising: a transmitting synchro having a rotor and stator, said rotor having a mechanical input and excited by a reference voltage; a receiving synchro having a rotor and stator, said transmitting synchro stator electrically connected with said receiving synchro stator; a quadrature voltage eliminator excited by said reference voltage and connected to the output of said receiving synchro rotor, said eliminator including a two terminal input for connecting an input signal thereto; a two position chopper having a reed driven back and forth between a first chopper contact and a second chopper contact at a reference frequency; means connecting said first chopper contact to an input terminal; a two terminal output for providing an output signal therefrom; means connecting said second chopper contact to an output terminal; resistance means connected on one end to said second chopper contact; and capacitance means connected on one end to said reed, the unconnected input terminal, unconnected output terminal and free ends of said resistance and capacitance means being connected together; a servomotor connected to the output of said eliminator; and means coupling the output of said servomotor to the rotor of said receiving synchro whereby said receiving synchro rotor is oriented to correspond with the position of said transmitting synchro rotor.

2. Apparatus in accordance with claim 1 wherein said means connecting said first chopper contact to an input terminal is a resistance.

3. Apparatus in accordance with claim 1 including, in addition, signal shaping means in said eliminator for providing an integral damping output signal from said eliminator.

4. A synchro system, comprising: a transmitting synchro having a rotor and stator, said rotor having a mechanical input and excited by a reference voltage at a reference frequency; a receiving synchro having a rotor and stator, said transmitting synchro stator electrically connected with said receiving synchro stator; a quadrature voltage eliminator including integral damping means, comprising: a two terminal input, means connecting said input to the output of said receiving synchro rotor, a two position chopper having a reed driven back and forth between a first chopper contact and a second chopper contact at said reference frequency, a first resistance connecting said first chopper contact to an input terminal, a two terminal output for providing an output signal therefrom, means connecting said second chopper contact to an output terminal, a second resistance connected on one end to said second chopper contact, a first capacitance connected to said reed, a second capacitance connected in series with said first capacitance, and a third resistance connected to shunt one of said capacitances, the unconnected input terminal, unconnected output terminal, free end of said second resistance and free end of said second capacitance being connected together; a servomotor; means connecting the input of said servomotor to the output of said eliminator; and means coupling the output of said servomotor to said receiving synchro rotor, whereby the latter is oriented to correspond with the position of said transmitting synchro rotor.

5. Apparatus in accordance with claim 4 including a fourth resistance connected to shunt the other capacitance.

6. A synchro system, comprising: a transmitting synchro having a rotor and stator, said rotor having a mechanical input and excited by a reference voltage at a reference frequency; a receiving synchro having a rotor and stator, said transmitting synchro stator electrically connected with said receiving synchro stator; a quadrature voltage eliminator including derivative damping means, comprising: a two terminal input, means connecting said input to the output of said receiving synchro rotor, a two position chopper having a reed driven back and forth between a first chopper contact and a second chopper contact at said reference frequency, a first resistance connecting said first chopper contact to an input terminal, a two terminal output for providing an output signal therefrom, means connecting said second chopper contact to an output terminal, a second resistance connected to said second chopper contact, a third resistance connected in series with said second resistance, a first capacitance connected to shunt said third resistance, and a second capacitance connected on one end to said reed, the unconnected input terminal, unconnected output terminal and free ends of said third resistance and second capacitance being connected together; a servomotor; means connecting the input of said servomotor to the output of said eliminator; and means coupling the output of said servomotor to said receiving synchro rotor, whereby the latter is oriented to correspond with the position of said transmitting synchro rotor.

7. A synchro system, comprising: a transmitting synchro having a rotor and stator, said rotor having a mechanical input and excited by a reference voltage at a reference frequency; a receiving synchro having a rotor and stator, said transmitting synchro stator electrically connected with said receiving synchro stator; a quadrature voltage eliminator including derivative damping means, comprising: a two terminal input, means connecting said input to the output of said receiving synchro rotor, a two position chopper having a reed driven back and forth between a first chopper contact and a second chopper contact at said reference frequency, a first capacitance in series with a first resistance connecting an input terminal to said first chopper contact, a second resistance connected to the common junction of said first capacitance and said first resistance, a third resistance connected in series with said second resistance, a second capacitance connected to shunt said third resistance, a two terminal output for providing an output signal therefrom, means connecting said second chopper contact to an output terminal, a fourth resistance connected on one end to said second chopper contact, and a third capacitance connected on one end to said reed, the unconnected input terminal, unconnected output terminal and free ends of said third resistance, fourth resistance and third capacitance being connected together; a servomotor; means connecting the input of said servomotor to the output of said eliminator; and means coupling the output of said servomotor to said receiving synchro rotor, whereby the latter is oriented to correspond with the position of said transmitting synchro rotor.

8. Apparatus in accordance with claim 1 including, in addition, a phase shifter connecting the output of said receiving synchro rotor with the input of said eliminator.

9. Apparatus in accordance with claim 1 wherein said eliminator includes signal shaping means for providing a derivative damping output signal.

10. Apparatus in accordance with claim 1 including in addition, a tachometer generator mechanically coupled to the output of said servomotor, the tachometer generator output being fed back to the input of said eliminator whereby damping of servomotor rotor is provided.

11. Apparatus in accordance with claim 10 including, in addition, means for adding the output of said tachometer generator to the output of said eliminator whereby additional damping of the servomotor rotor is provided.

12. A synchro system, comprising: a transmitting synchro having a rotor and stator, said rotor having a mechanical input and excited by a reference voltage at a reference frequency; a receiving synchro having a rotor and stator, said transmitting synchro stator electrically connected with said receiving synchro stator; a quadrature voltage eliminator including integral damping means, comprising: a two terminal input, means connecting said input to the output of said receiving synchro rotor, a two position chopper having a reed driven back and forth between a first chopper contact and a second chopper contact at said reference frequency, a first resistance connected on one end to an input terminal, a first capacitance connecting the free end of said first resistance and said first chopper contact, a two terminal output for providing an output signal therefrom, means connecting said second chopper contact to an output terminal, a second resistance connected on one end to said second chopper contact, and a second capacitance connected on one end to said reed, the unconnected input terminal, unconnected output terminal and free ends of said second resistance and said second capacitance being connected together; a servomotor; means connecting the input of said servomotor to the output of said eliminator; and means coupling the output of said servomotor to said receiving synchro rotor, whereby the latter is oriented to correspond with the position of said transmitting synchro rotor.

13. A synchro system, comprising: a transmitting synchro having a rotor and stator, said rotor having a mechanical input and a winding for excitation by an A. C. reference voltage at a reference frequency; a receiving synchro having a rotor and stator, said transmitting synchro stator electrically connected with said receiving synchro stator; a quadrature voltage eliminator comprising an input circuit, an output circuit, means connecting said input circuit to the winding of said receiving synchro rotor, electrical storage means, means connecting said storage means to said input circuit and disconnecting said storage means from said output circuit during a first half cycle of said reference voltage for providing said storage means with an electrical value in accordance with a signal in said input circuit, and means disconnecting said storage means from said input circuit and connecting said storage means to said output circuit during the second half cycle of said reference voltage for providing said output circuit with the signal contained in said storage means; a servomotor; means connecting the input of said servomotor to said eliminator output circuit; and means coupling the output of said servomotor to said receiving synchro rotor, whereby said receiving synchro rotor is oriented to correspond with the position of said transmitting synchro rotor.

14. A synchro system, comprising: a transmitting synchro having a rotor and stator, said rotor having a mechanical input and a winding for excitation by an A. C. reference voltage at a reference frequency; a receiving synchro having a rotor and stator, said transmitting synchro stator electrically connected with said receiving synchro stator; a quadrature voltage eliminator comprising an input circuit, an output circuit, means connecting said input circuit to the winding of said receiving synchro rotor, capacitive storage means, means for charging said capacitive storage means from said input circuit during a first half cycle of said reference voltage, and means for transferring the voltage on said capacitive storage means to said output circuit during the second half cycle of said reference voltage; a servomotor; means connecting the input of said servomotor to said eliminator output circuit; and means coupling the output of said servomotor to said receiving synchro rotor, whereby said receiving synchro rotor is oriented to correspond with the position of said transmitting synchro rotor.

15. Apparatus in accordance with claim 14 including means effectively keeping said output circuit disconnected and open from said input circuit.

16. A synchro system, comprising: a transmitting synchro having a rotor and stator, said rotor having a mechanical input and a winding for excitation by an A. C. reference voltage at a reference frequency; a receiving synchro having a rotor and stator, said transmitting synchro stator electrically connected with said receiving synchro stator; a quadrature voltage eliminator comprising an input circuit, an output circuit, means connecting said input circuit to the winding of said receiving synchro rotor, capacitive storage means, means for charging said capacitive storage means from said input circuit during a first half cycle of said reference frequency while simultaneously effectively disconnecting sad capacitive storage means from said output circuit, and means for transferring the voltage on said capacitive storage means to said output circuit during the second half cycle of said reference frequency while simultaneously effectively disconnecting said storage means from said input circuit; a servomotor; means connecting the input of said servomotor to said eliminator output circuit; and means coupling the output of said servomotor to said receiving synchro rotor, whereby said receiving synchro rotor is oriented to correspond with the position of said transmitting synchro rotor.

17. A synchro system, comprising: a transmitting synchro having a rotor and stator, said rotor having a mechanical input and a winding for excitation by an A. C. reference voltage at a reference frequency; a receiving synchro having a rotor and stator, said transmitting synchro stator electrically connected with said receiving synchro stator; a quadrature voltage eliminator comprising an input circuit, an output circuit, means connecting said input circuit to said receiving synchro rotor winding, a capacitor, a capacitor control winding for energization by said reference voltage, means responsive to one polarity of said control winding to charge said capacitor to the voltage of a signal in said input circuit during a first half cycle of said reference voltage and to block said output circuit from said input circuit and said capacitor, and means responsive to the opposite polarity of said control winding to transfer the voltage on said capacitor to said output circuit during the second half cycle of said reference voltage and to block said input circuit from said output circuit and said capacitor; a servomotor; means connecting the input of said servomotor to said eliminator output circuit; and means coupling the output of said servomotor to said receiving synchro rotor, whereby said receiving synchro rotor is oriented to correspond with the position of said transmitting synchro rotor.

18. Apparatus in accordance with claim 13 wherein said circuits contain signal shaping elements to provide an integral damping output signal from said quadrature eliminator.

19. Apparatus in accordance with claim 13 wherein said circuits contain signal shaping elements to provide a derivative damping output signal from said quadrature eliminator.

20. Apparatus in accordance with claim 13 wherein said quadrature eliminator is further characterized by an electro-mechanical chopper having a pole contact alternately connectable to each of two operating contacts, said operating contacts connected respectively to said input circuit and said output circuit, said pole contact connected to said storage means, and means for vibrating said pole contact between said operating contacts at said reference frequency.

21. Apparatus in accordance with claim 13 wherein said quadrature eliminator is further characterized by a two terminal input to said input circuit, a two terminal output from said output circuit, a two position chopper having a movable element alternately connectable to a first chopper contact and to a second chopper contact, means for driving said movable element between said first and second chopper contacts at said reference frequency, means connecting said first chopper contact to an input terminal, means connecting said second chopper contact to an output terminal, and capacitance means connected at one end to said movable element, the unconnected input terminal, unconnected output terminal, and other end of said capacitance means being connected together.

22. Apparatus in accordance with claim 21 wherein said means connecting said first chopper contact to an input terminal consists of a first resistance and a second capacitance connected in series, wherein said means connecting said second chopper contact to an output terminal consists of a second resistance, and including a third resistance connected across said two input terminals, and an inductance and a third capacitance connected in parallel across said two output terminals, whereby first derivative damping is provided to said servomotor.

23. Apparatus in accordance with claim 13 wherein said quadrature eliminator is further characterized by a first rectifier means having its cathode connected to said input circuit, a second rectifier means having its anode connected to said first rectifier cathode, a third rectifier means having its anode connected to said output circuit, a fourth rectifier means having its cathode connected to said third rectifier anode, means connecting said first rectifier anode to said third rectifier cathode, means connecting said second rectifier cathode to said fourth rectifier anode, center-tapped impedance means having its ends connected respectively to said latter two connecting means, said electrical storage means connected to the center tap of said impedance means, and means for impressing a voltage at said reference frequency across the ends of said impedance means.

24. Apparatus in accordance with claim 13 wherein said quadrature eliminator is characterized by a two terminal input to said input circuit, a two terminal output from said output circuit, a ring formed from four diodes connected plate to cathode in series, a transformer having a primary and a center tapped secondary, means for energizing said primary at said reference frequency, said secondary connected across and equally dividing said ring into two branches, means connecting an input terminal to the center of one branch, means connecting an output terminal to the center of the other branch, a capacitance connected at one end to the center tap of said secondary, the unconnected input terminal, unconnected output terminal, and free end of said capacitance being connected together.

25. Apparatus in accordance with claim 24 including stabilizing resistances connecting the ends of said secondary to the ends of said diode branches.

References Cited in the file of this patent

UNITED STATES PATENTS

| | | |
|---|---|---|
| 2,115,086 | Riggs | Apr. 26, 1938 |
| 2,584,954 | Williams | Feb. 5, 1952 |
| 2,632,872 | Warsher | Mar. 24, 1953 |
| 2,676,290 | Ciscel | Apr. 20, 1954 |